Jan. 14, 1936. N. SKILLMAN 2,027,560
SELF LUBRICATING, SELF ALIGNING BEARING AND METHOD OF FORMING SAME
Filed April 17, 1933
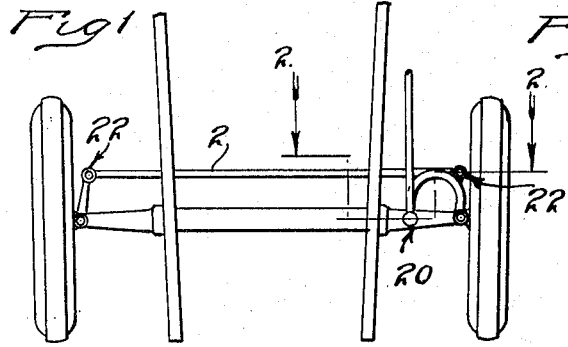
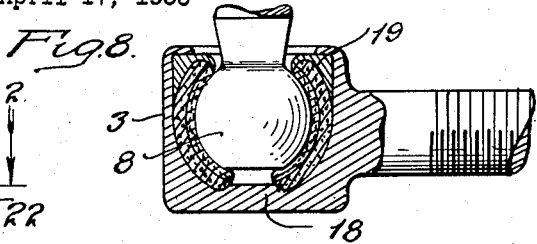
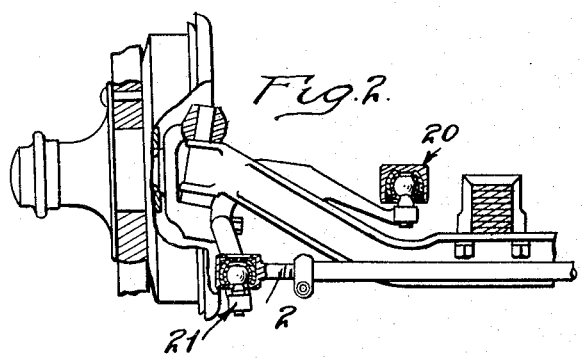
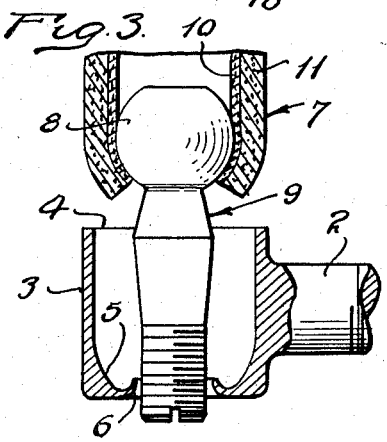
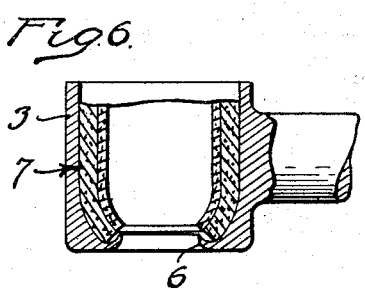
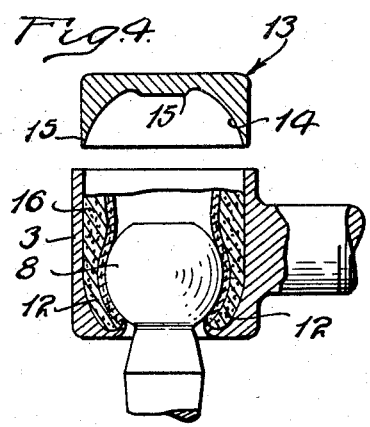
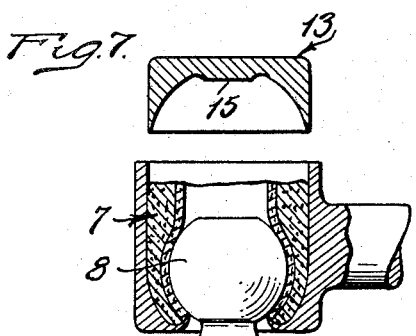
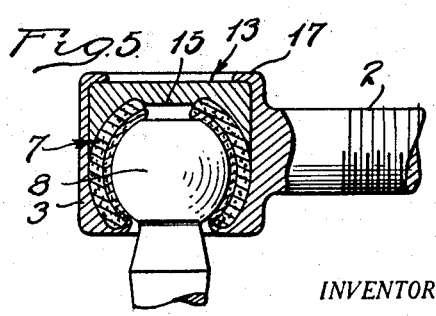
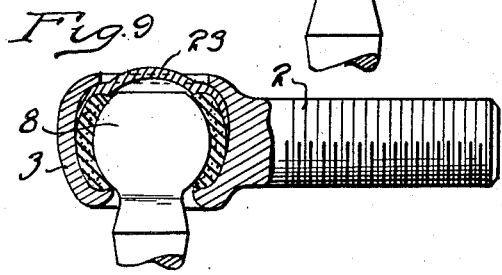
INVENTOR.
NEWTON SKILLMAN
BY
Barnes, Kisselle & Laughlin
ATTORNEYS.

Patented Jan. 14, 1936

2,027,560

UNITED STATES PATENT OFFICE 2,027,560

SELF-LUBRICATING, SELF-ALIGNING BEARING AND METHOD OF FORMING SAME

Newton Skillman, Detroit, Mich., assignor to O. & S. Bearing Company, Detroit, Mich., a corporation of Michigan Application April 17, 1933, Serial No. 666,522

17 Claims. (Cl. 29—149.5)

This invention relates to a self-lubricating, self-aligning bearing and method of forming same. It relates to certain improvements over the self-aligning bearings disclosed in my Patents No. 1,793,874 of February 24, 1931, and No. 1,817,528 of August 4, 1931, and application Serial No. 376,057 filed July 5, 1929, and particularly to a self-aligning bearing wherein the self-lubricating bushing is placed under uniform pressure around the inner bearing unit, through the medium of a two part outer bearing housing.

It is one of the primary objects of the present invention to provide a self-aligning, self-lubricating bearing unit of the type which may be used particularly as a tie rod end, although it may be used advantageously as a self-aligning connecting unit in any assembly where the pressure applied to the bushing material must be accurate or relatively great, or both.

A further feature of the invention relates to the formation of a self-lubricating, self-aligning bearing unit of the two part type wherein, irrespective of the outer shape or formation of the housing, the effective internal surfaces thereof are so shaped and formed as to provide substantially uniform pressure on the bushing completely around the inner bearing member.

More specifically, the present invention contemplates a self-aligning bearing unit wherein the outer housing could be cylindrical in shape if necessary because of structural details or surroundings, one end of said housing converging around and approximating the spherical contour of a ball stud, and the other end of the housing receiving a cap member so shaped as to cooperate with said converging portion of the housing so as to form an effective substantially spherical bearing surface for the outer housing or bearing member; the bushing not only being placed under uniform pressure because of this internal substantially spherical surface but such cap being the means for applying any desired pressure to the bushing prior to the locking of the cap in position by deformation of one part of the outer housing.

Other features including method steps and structural details will be more clearly brought out in the specification and claims.

In the drawing:

Fig. 1 is a more or less diagrammatic plan view illustrating the embodiment of my self-aligning bearing units as tie rod ends in a standard steering gear.

Fig. 2 is an enlarged sectional view taken substantially on line 2—2 of Fig. 1, illustrating in detail the application of the self-aligning bearing unit as a tie rod end.

Fig. 3 illustrates the first step in the method wherein the lubricant impregnated fibrous material is wrapped around the ball stud just prior to assembly.

Fig. 4 is a sectional view illustrating the second step in this method when pressure has been applied to a portion of the bushing material by the ball stud and the assembly proper is in position to receive the cap.

Fig. 5 is a view similar to Fig. 4 and showing the last step of assembly wherein pressure has been applied to the cap member to uniformly compress the material around the ball stud and the cap member has been locked in place by deforming the outer housing.

Fig. 6 is a sectional view illustrating a modified step in the assembly wherein the layer of bushing material is first inserted within the outer housing.

Fig. 7 illustrates the second step in this modified method of assembly wherein the ball stud has been forced through the annular bushing material to partly shape and compress the same particularly around the lower end of the housing, the cap being shown in position preparatory to completing the compression of the bushing material, prior to final assembly.

Fig. 8 is a sectional view of a third form of self-aligning bearing assembly wherein the ball stud protrudes through the cap member instead of through the end of the main housing.

Fig. 9 illustrates a further modified form of self-aligning bearing member wherein the cap member is formed by stamping.

The present invention may be best described by the method of forming the self-aligning bearing unit and in Figs. 3, 4 and 5 I have illustrated the preferred method of assembling and forming a permanent self-aligning bearing unit as used in one end of a shock absorber link or as forming what is known as a tie rod end. The link or tie rod may be generally designated 2 the end of which is provided with a housing member 3, open at one end as at 4 and having the other end inwardly converging as at 5 and of arcuate cross sectional contour. The annular periphery 6 of this inwardly converging end is preferably turned in as shown in Fig. 3 to receive and confine the bushing material, as will be later described. The link or rod 2 and the housing 3 may be formed in any well known manner such as by forging or stamping.

In assembly, a predetermined length of lubricant impregnated fibrous material 7 is wrapped around the substantially spherical head 8 of a ball stud 9. This material may consist of an inner layer 10 of asbestos woven wire which materially cuts down friction and an outer layer 11 of woven cotton material, the entire length of material being impregnated with graphite or other lubricating material; or the strip 7 may be woven completely from any fibrous material and lubricant impregnated. This strip of fibrous material 7 will hereinafter be referred to as a "bushing" and it will be understood here that I am referring broadly to a compressible expansible packing or material located between the inner and outer bearing members and assisting in positioning and locking the ball joint in place as distinguished from a mere bearing surface for the ball joint.

The ball stud 9 and the bushing 7 may then be forced into the housing 3 and a portion 12 of the annular bushing placed under compression by this insertion of the ball stud within the housing, as best shown in Fig. 4. A cap member 13 having a substantially hemispherical inner surface 14 and a projection 15, forming an annular button for one end of the bushing, is then moved into the open end of the housing 3. The annular tapering periphery 15 of the cap will, of course, hug the side walls of the housing and as this cap is forced inwardly by a spring pressed plunger or a spring pad, the top portion 16 of the bushing will be preformed and compressed around the top end of the ball 8, as best shown in Fig. 5.

Any amount of pressure may be applied by the spring pressed plunger or spring pad on the cap 13 so as to apply a correspondingly predetermined pressure upon the bushing material to compress the same; when sufficient pressure has been built up between the cap 3 and the bushing material, as may be shown by a gauge or other indicating means, the open end of the housing 3 may be peened over or deformed as at 17 so as to lock the cap 13 in the desired position, the compressed bushing 7 serving to lock the ball stud permanently in position and at the same time acting expansively upon the ball stud 8 and against the internal surfaces of the outer bearing member formed by the housing 3 and the cap 13. The effective surface of the outer bearing member formed by the complemental relationship between the portion 5 and portion 14 of the housing and cap respectively, will insure a uniform pressure between the compressed bushing and the ball stud 8.

Thus, while the turning in or deforming of the portion 17 of the housing 3 serves to maintain the bushing material under compression and to permanently lock the ball stud in position, the main pressure upon the bushing material, through the medium of the cap 13, is applied before the deforming of a portion of the housing. The improved result here is that it makes it possible to more accurately determine the exact amount of pressure applied to the bushing before final permanent or integral formation of the outer housing; whereby if the final pressure upon the bushing material should be applied directly by the deforming of the outer bearing member or housing itself, the same consistent compression of the bushing material or, in other words, the resultant expansive action between the bushing and the bearing surfaces, over a long production period, would not necessarily be obtained. For instance, in the method described in connection with Figs. 3, 4 and 5, even if the bushing should be slightly undersized, the predetermined pressure upon the cap 13 during assembly would still be obtained.

A modified method of forming and assembling is disclosed in Figs. 6 and 7 wherein the bushing 7 is first inserted within the housing 3 and the ball stud 8 then forced through the bushing to initially place a portion of the bushing material under compression. The cap member 13 may then be forced into place to complete the assembly in the same manner as above described. The annular end wall formed by the portion 14 and the annular end wall formed by the turned in portion 6 of the cap and housing, respectively, serves to contact with the ends of the annular bushing so as to positively and definitely confine the same between the ball stud 8, the effective inner surfaces of the outer bearing and the turned in end walls formed by the portions 14 and 6.

In Fig. 8 I have shown a complete permanent self-aligning unit which may be formed and assembled by the same steps disclosed in Figs. 3 to 5 or Figs. 6 and 7, but here the housing 3 is provided with a solid end wall 18 and while the final pressure upon the bushing may be applied by a cap 19, the cap here is apertured to receive the ball stud instead of the housing. This reversal of parts is quite important in some installations where the member connected to the self-aligning bearing is a drag link or the like which is quite heavy. By assembling the self-aligning bearing unit so that the solid end of the housing is uppermost, as shown at 20 in Fig. 2, it will be seen that continued operation and weight of the drag link will have no effect upon any possible breaking down of the bearing unit, whereas if the bearing unit were arranged as shown at 21 in Fig. 2, there might be some possibility of breakdown because here the whole stress is taken by the peened over end of the outer bearing housing. In Fig. 1 I have shown a typical steering gear structure wherein the self-aligning bearing members, as indicated at 22, form part of the tie rod ends.

In the modified unit shown in Fig. 9 the cap member 23, instead of being a die casting as shown in Figs. 4 and 7, is formed of a single stamping; otherwise the method of assembly and the resulting uniform compression of the bushing is the same as described in connection with Figs. 3 to 5 or 6 and 7.

What I claim is:

1. The method of forming a permanent, non-adjustable universal joint, which comprises forming a portion of an outer housing with an inwardly converging contour at one end, inserting a bearing member having a longitudinally varying contour and a lubricant impregnated compressible expansible material within said housing, freely telescoping an outer housing member within said first housing portion to a point stopped only by said material whereby to compress and close in said material around the inner bearing member, said pressure being sufficient to lock the inner bearing in position, and then fixably locking the outer housing member relative to said housing to maintain said material under compression and lock said inner bearing member in position.

2. The method of forming a permanent, non-adjustable universal joint, which comprises forming a portion of an outer housing with an inwardly converging contour at one end, inserting a bearing member having a longitudinally varying contour and a strip of lubricant impregnated compressible expansible material within said housing, telescoping an outer housing member within said first housing portion to compress and close in said material around the inner bearing member, said pressure being predetermined independently of the amount of said material and being sufficient to lock the inner bearing in position, and then distorting a portion of the outer housing above the telescoped portions of said housing and member to maintain said material under compression and lock said inner bearing member in position.

3. The method of forming a permanent, non-adjustable universal joint, which comprises forming a portion of an outer housing with an inwardly converging contour at one end, inserting a bearing member having a longitudinally varying contour and a strip of lubricant impregnated compressible expansible material within said housing, telescoping an outer housing member within said first housing portion to a point stopped only by said material whereby to compress and close in said material around the inner bearing member, said pressure being sufficient to completely form and shape said bushing and lock the inner bearing in position, and then fixably locking the outer housing member relative to said housing to maintain said material under compression and lock said inner bearing member in position.

4. The method of forming a permanent, non-adjustable universal joint, which comprises forming a portion of an outer housing with an inwardly converging contour at one end, inserting a bearing member having a longitudinally varying contour and a strip of lubricant impregnated compressible expansible material within said housing, telescoping an outer housing member within said first housing portion to a point stopped only by said material whereby to compress and close in said material around the inner bearing member, said pressure being predetermined independently of the amount of said material and being sufficient to completely form and shape said bushing and lock the inner bearing in position, and then fixably locking the outer housing member relative to said housing to maintain said material under compression and lock said inner bearing member in position.

5. The method of forming self-aligning bearings, which comprises forming an outer bearing housing with an inwardly converging contour at one end and an opening at the other end, inserting a bearing member of longitudinally varying contour and a bushing of lubricant impregnated compressible material within said housing, placing a portion of the bushing material adjacent the converging end of said housing under compression, then applying pressure to the bushing material at the open end of the housing to compress said material and shape the same around the inner bearing member, and then deforming a portion of said outer housing to maintain said bushing under compression and lock the inner bearing member into position.

6. The method of forming self-aligning bearings, which comprises forming an outer bearing housing with an inwardly converging contour at one end and an opening at the other end, inserting an annular bushing of lubricant impregnated compressible material within said housing, partially compressing a portion of said bushing by inserting a bearing member of longitudinally varying contour, then applying pressure to the bushing material at the open end of the housing to compress said material and shape the same around the inner bearing member, and then deforming a portion of said outer housing to maintain said bushing under compression and lock the inner bearing member into position.

7. The method of forming self-aligning bearings, which comprises inserting a bushing of lubricant impregnated compressible material within an outer bearing shell having the inner surface at one end thereof of arcuate contour and the inner surface at the other end of substantially cylindrical contour, inserting a substantially spherical bearing member with a connecting stem into said bearing shell, forcing an outer bearing shell member within the substantially cylindrical portion of said main outer shell to shape the bushing around the spherical inner bearing member, placing said material under compression to prevent longitudinal movement of the inner bearing member and then fixably locking said outer bearing shell member within said outer bearing shell whereby to maintain said bushing material under compression and lock said inner bearing member in position.

8. The method of forming self-aligning bearings, which comprises inserting a bushing of compressible material within an outer bearing shell having the inner surface at one end thereof of arcuate contour, inserting a substantially spherical bearing member with a connecting stem into said bearing shell, compressing a portion of the bushing material between the arcuate shaped end of the outer bearing shell and the inner bearing member, telescoping an outer bearing shell member within said main outer shell to shape the bushing around the spherical inner bearing member and placing said material under a predetermined compression to prevent longitudinal movement of the inner bearing member, and then fixably locking said outer bearing shell member within said outer bearing shell whereby to maintain said bushing material under compression and lock said inner bearing member in position.

9. A self-aligning, self-lubricating bearing comprising an inner bearing member of longitudinally varying contour, a strip of compressed lubricant impregnated bushing material positioned around said member, and an outer bearing member formed in two parts, one of said parts substantially enclosing the inner member and having one end converging inwardly to receive and confine a portion of the bushing material, and the other outer bearing member part comprising a cap member positioned within said first named part to place said bushing material under compression, said second named outer bearing part being locked in position by the other outer bearing part and the inner bearing member being locked in position by said compressed bushing material.

10. A self-aligning, self-lubricating bearing, comprising an inner bearing member of longitudinally varying contour, a bushing of compressed material positioned around the inner bearing member, and an outer bearing member formed of two parts, one part converging inwardly at one end to form a bearing surface having a portion of less diameter than the inner bearing member, the other part of said bearing member comprising a cap freely telescoped within the other bearing member part, said second part of the outer bearing member being telescoped sufficiently within the first part as to place the bushing material under predetermined compression, and said first named outer bearing part fixably locking the second part at said telescoped position to maintain said bushing material under said predetermined compression whereby it acts expansively against said inner bearing member and the inner surfaces of said outer bearing member parts and locks the inner bearing member in position.

11. A self-aligning bearing comprising a bearing housing, an inner bearing member having a surface of longitudinally varying contour and a connecting portion protruding therefrom, said bearing housing comprising two parts, one part substantially completely surrounding said inner bearing member up to a point closely adjacent said protruding portion, said one part having an inwardly converging portion at one end and a substantially cylindrical portion at the other end, said other bearing part comprising a cap member fixedly held in position within the cylindrical portion of said other part of said bearing housing, a layer of compressible expansible bushing material between the two part housing and the inner bearing member, said material being deformed and compressed and acting expansively against the inner bearing member and the bearing housing and locking said inner bearing member in position within said bearing housing.

12. A self-aligning bearing comprising a bearing housing, an inner bearing member having a surface of longitudinally varying contour and a connecting portion protruding therefrom, said bearing housing comprising two parts, one part substantially completely surrounding said inner bearing member up to a point closely adjacent said protruding portion, said one part having an inwardly converging portion at one end and a substantially cylindrical portion at the other end, said other bearing part comprising a cap member fixedly held in position within the cylindrical portion of said other part of said bearing housing, a layer of bushing material positioned between the two part housing and the inner bearing member, said material being under compression so as to act expansively against the inner bearing member and the bearing housing and lock said inner bearing member in position within said bearing housing, and one end of said two part housing being closed and the other end being open only sufficiently to receive said protruding portion and allow a slight relative movement thereof.

13. The method of forming a permanent, non-adjustable universal joint, which comprises forming a portion of an outer housing with an inwardly converging contour at one end, inserting a bearing member having a longitudinally varying contour and a compressible expansible material substantially completely within said housing, telescoping an outer housing member within said first housing portion to compress and close in said material around the inner bearing member, said pressure being sufficient to lock the inner bearing in position, and then distorting a portion of the outer housing to maintain said material under compression and lock said inner bearing member in position.

14. The method of forming self-aligning bearings, which comprises inserting a bushing of compressible material within an outer bearing shell having the inner surface at one end thereof of arcuate contour and a portion of the inner surface at the other end of substantially cylindrical contour, inserting a substantially spherical bearing member into said bearing shell, forcing an outer bearing shell member within said main outer shell to shape the bushing around the spherical inner bearing member, placing said material under compression to prevent longitudinal movement of the inner bearing member and then fixably locking said outer bearing shell member within said outer bearing shell whereby to maintain said bushing material under compression and lock said inner bearing member in position.

15. The method of forming self-aligning bearings, which comprises forming a portion of an outer housing with an inwardly converging contour at one end, inserting a bearing member having a longitudinally varying contour and compressible expansible bushing material substantially completely within said housing, telescoping an outer housing member within said first housing portion to compress and close in said material around the inner bearing member, and then fixably locking the telescoped portion of said housing member within said housing whereby to maintain said bushing material under compression and lock said inner bearing member in position.

16. The method of forming self-aligning bearings, which comprises forming a portion of an outer bearing housing with an inwardly converging contour at one end, inserting a bearing member having a longitudinally varying contour and compressible expansible bushing material within said housing, inserting an outer housing member into the housing at the end opposite said inwardly converging portion, said member having an annular outwardly flaring portion which telescopes within the outer housing to compress and close in said bushing material around the inner bearing member, and then fixably locking said housing member when the same has been moved within the housing to place the bushing material under sufficient degree of compression whereby to maintain said bushing material under compression and lock said inner bearing member in position.

17. A self-aligning bearing comprising an inner bearing member of longitudinally varying contour, bushing material compressed around said member, and an outer bearing housing formed in two parts, one of said parts substantially enclosing the inner member and bushing and having one end converging inwardly to assist in confining the bushing material, and the other outer bearing housing part comprising a cap member having a portion telescoped within said first named part and contacting with compressed bushing material, said second named outer housing part being locked in telescoped position by the other housing part and the inner bearing member being locked in position by said compressed bushing material acting expansively on said inner bearing member and the two parts of the outer housing member.

NEWTON SKILLMAN.